United States Patent
Dong et al.

(10) Patent No.: US 11,936,183 B2
(45) Date of Patent: Mar. 19, 2024

(54) ENERGY-INTERNET SYSTEM, ENERGY ROUTING CONVERSION DEVICE, AND ENERGY CONTROL METHOD

(71) Applicant: GREE ELECTRIC APPLIANCES, INC. OF ZHUHAI, Qianshan Zhuhai (CN)

(72) Inventors: Mingzhu Dong, Zhuhai (CN); Zhigang Zhao, Zhuhai (CN); Meng Huang, Zhuhai (CN); Xuefen Zhang, Zhuhai (CN); Shugong Nan, Zhuhai (CN); Shiyong Jiang, Zhuhai (CN); Meng Li, Zhuhai (CN); Wenqiang Tang, Zhuhai (CN); Peng Ren, Zhuhai (CN); Wu Wen, Zhuhai (CN); Lingjun Wang, Zhuhai (CN); Xiao Luo, Zhuhai (CN); Wenhao Wu, Zhuhai (CN); Jianjun Huang, Zhuhai (CN); Weijin Li, Zhuhai (CN); Yunhong Zeng, Zhuhai (CN); Bei Chen, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 682 days.

(21) Appl. No.: 16/966,846

(22) PCT Filed: Dec. 13, 2018

(86) PCT No.: PCT/CN2018/120843
§ 371 (c)(1),
(2) Date: Jul. 31, 2020

(87) PCT Pub. No.: WO2019/148980
PCT Pub. Date: Aug. 8, 2019

(65) Prior Publication Data
US 2021/0044146 A1 Feb. 11, 2021

(30) Foreign Application Priority Data
Feb. 2, 2018 (CN) .......... 201810108480.1

(51) Int. Cl.
H02J 13/00 (2006.01)
H02J 3/38 (2006.01)
H02J 3/46 (2006.01)

(52) U.S. Cl.
CPC ........ H02J 13/00028 (2020.01); H02J 3/381 (2013.01); H02J 3/46 (2013.01); H02J 2300/20 (2020.01); H02J 2300/22 (2020.01); H02J 2300/24 (2020.01); H02J 2300/28 (2020.01)

(58) Field of Classification Search
CPC .. H02J 13/00028; H02J 3/381; H02J 2300/24; H02J 2300/28
See application file for complete search history.

(56) References Cited

U.S. PATENT DOCUMENTS

| | | |
|---|---|---|
| 2014/0265607 A1 | 9/2014 | Peting |
| 2015/0207316 A1 | 7/2015 | Saussele et al. |
| 2016/0241137 A1 | 8/2016 | Sun et al. |

FOREIGN PATENT DOCUMENTS

| | | |
|---|---|---|
| CN | 104485727 A | 4/2015 |
| CN | 104701882 A | 6/2015 |

(Continued)

OTHER PUBLICATIONS

Y. R. Kafle, K. Mahmud, S. Morsalin and G. E. Town, "Towards an internet of energy," 2016 IEEE International Conference on Power System Technology (POWERCON), Wollongong, NSW, Australia, 2016, pp. 1-6, doi: 10.1109/POWERCON.2016.7754036. (Year: 2016).*

(Continued)

Primary Examiner — Daniel Cavallari
(74) Attorney, Agent, or Firm — Christensen O'Connor Johnson Kindness PLLC (57) ABSTRACT

An energy Internet system, an energy routing conversion device, and an energy control method, relating to a field of energy information. An alternating-current (AC) side energy routing conversion device of the energy Internet system includes a plurality of first route ports, and a direct-current (DC) side energy routing conversion device includes a plurality of second route ports, where each second route port (Continued)

is connected to a corresponding first route port by means of a corresponding DC busbar. A plurality of energy devices are connected to a DC busbar by means of corresponding first AC/DC converters or first DC converters. The AC side energy routing conversion device and the DC side energy routing conversion device collect energy information of the energy devices and adjust energy of the energy devices on a basis of energy balance constraint conditions.

8 Claims, 5 Drawing Sheets

(56) References Cited

FOREIGN PATENT DOCUMENTS

| CN | 106329530 A | 1/2017 |
|----|-------------|--------|
| CN | 108199376 A | 6/2018 |
| JP | 2008253002 A | 10/2008 |
| JP | 2014023376 A | 2/2014 |
| JP | 2017216867 A | 12/2017 |

OTHER PUBLICATIONS

International Search Report dated Mar. 6, 2019, issued in corresponding International Application No. PCT/CN2018/120843, filed Dec. 13, 2018, 6 pages.

Huang, A.Q., et al., "The Future Renewable Electric Energy Delivery and Management (FREEDM) System: The Energy Internet", Proceedings of the IEEE, vol. 99, No. 1, Jan. 2011, pp. 133-148.

Extended European Search Report dated Mar. 2, 2021, issued in corresponding European Application No. EP 18903156, 9 pages.

Office Action dated Mar. 2, 2021, in corresponding Indian application No. 202037037403, 5 pages.

Office Action dated Aug. 31, 2021, in corresponding Japanese application No. 2020-541714 (Japanese version), 6 pages.

Chen, Z., et al., "Discussion on Energy Internet and Its Key Technology", Journal of Power and Energy Engineering, Nov. 21, 2017, pp. 1-9.

* cited by examiner

ENERGY-INTERNET SYSTEM, ENERGY ROUTING CONVERSION DEVICE, AND ENERGY CONTROL METHOD

This application is based on and claims priority to Chinese Patent Application No. 201810108480.1, filed on Feb. 2, 2018, which is incorporated herein by reference in its entirety.

TECHNICAL FIELD

The disclosure relates to the field of energy information, and in particular to an energy Internet system, an energy routing conversion device, and an energy control method.

BACKGROUND

With the distributed application of new energy such as photovoltaic energy, wind power etc. and with the rapid development of photovoltaic air conditioning and electric vehicles, a trend of electrification, cleanliness and intelligence has been formed in power generation, energy storage, electricity consumption and grid, which promotes the popularity and development of direct-current (DC) energy system.

SUMMARY

In accordance with one aspect of the present disclosure, an energy Internet system is provided and includes: an alternating-current (AC) side energy routing conversion device including a plurality of first route ports; a direct-current (DC) side energy routing conversion device including a plurality of second route ports, wherein each of the plurality of second route ports is connected to a corresponding first route port by a corresponding DC busbar; and a plurality of energy devices, each connected to the DC busbar through a corresponding first AC/DC converter or a first DC/DC converter; wherein the AC side energy routing conversion device and the DC side energy routing conversion device collect energy information of the plurality of energy devices, and adjust energy of each of the plurality of energy devices on a basis of energy balance constraint conditions.

In some embodiments, the AC side energy routing conversion device further includes an AC access terminal configured to access an AC distribution power grid device; and the DC side energy routing conversion device further includes a DC access terminal configured to access a DC distribution power grid device through a second DC/DC converter.

In some embodiments, the AC side energy routing conversion device is an AC side energy router; and the DC side energy routing conversion device is a DC side energy router.

In some embodiments, the AC side energy routing conversion device includes a plurality of third AC/DC converters; wherein first ends of the plurality of third AC/DC converters are connected to each other, and a second end of each of the plurality of third AC/DC converters is used as a first route port; the DC side energy routing conversion device includes a plurality of third DC/DC converters; wherein first ends of the plurality of third DC/DC converters are connected to each other, and a second end of each of the plurality of third DC/DC converters is used as a second route port.

In some embodiments, after collecting the energy information of the plurality of energy devices and energy information of the AC distribution power grid device, the AC side energy routing conversion device adjusts energy of the plurality of energy devices and energy of the AC distribution power grid device on the basis of the energy balance constraint conditions.

In some embodiments, after collecting the energy information of the plurality of energy devices and energy of the DC distribution power grid device, the DC side energy routing conversion device adjusts energy of the plurality of energy devices and energy of the DC distribution power grid device on the basis of the energy balance constraint conditions.

In some embodiments, the energy devices include at least one of an energy storage device, a power consumption device, and a power generation device.

In some embodiments, each of the energy devices has a behavior characteristic.

In some embodiments, the energy information includes voltage parameters, current parameters, power parameters, and electricity quantity parameters.

In accordance with another aspect of the present disclosure, an energy routing conversion device is provided, and includes an energy collecting unit configured to collect energy information of a plurality of energy devices, and an energy distribution unit configured to adjust energy of each of the plurality of energy devices on a basis of energy balance constraint conditions.

In some embodiments, the energy collecting unit is configured to further collect energy information of a distribution power grid device; and the energy distribution unit is configured to further adjust energy of the distribution power grid device and energy of the plurality of energy devices on the basis of the energy balance constraint conditions.

In some embodiments, the energy collecting unit is configured to further collect energy information of each DC busbar; and the energy distribution unit is configured to further adjust energy of each DC busbar on the basis of the energy balance constraint conditions.

In some embodiments, the energy information includes voltage parameters, current parameters, power parameters, and electricity quantity parameters.

In some embodiments, the energy devices include at least one of an energy storage device, a power consumption device, and a power generation device.

In some embodiments, the energy balance constraint conditions include: the voltage parameters, the current parameters, the power parameters, and the electricity quantity parameters of the power generation device, the energy storage device, the power consumption device, and the distribution power grid device are within respective threshold ranges thereof respectively.

In some embodiments, wherein the energy balance constraint conditions further include: a sum of powers of the power generation device, the energy storage device, the power consumption device, and the distribution power grid device is 0; and a sum of currents of the power generation device, the energy storage device, the power consumption device, and the distribution power grid device is 0.

In some embodiments, the energy balance constraint conditions further include: a sum of powers of all DC busbars is 0; and a sum of currents of all DC busbars is 0.

In some embodiments, a power parameter of the power generation device is related to a voltage parameter, a current parameter, and a characteristic parameter of the power generation device; a power parameter of the energy storage device is related to a voltage parameter, a current parameter, a temperature parameter, and a capacity parameter of the energy storage device; a power parameter of the power consumption device is related to a voltage parameter and a current parameter of the power consumption device; and a power parameter of the distribution power grid device is related to a voltage parameter, a current parameter, and a power factor parameter of the distribution power grid device.

In accordance with another aspect of the present disclosure, an energy control method is provided and includes: collecting energy information of a plurality of energy devices; and adjusting energy of each of the plurality of energy devices on a basis of energy balance constraint conditions.

In some embodiments, the energy control method further includes: collecting energy information of a distribution power grid device; and adjusting energy of the distribution power grid device and energy of the plurality of energy devices on the basis of the energy balance constraint conditions.

In some embodiments, the energy control method further includes: collecting energy information of each DC busbar; and adjusting energy of each DC busbar on the basis of the energy balance constraint conditions.

In accordance with another aspect of the present disclosure, an energy routing conversion device is provided and includes: a memory, and a processor coupled to the memory and configured to execute the above energy control method on a basis of instructions stored in the memory.

In accordance with another aspect of the present disclosure, a computer-readable storage medium is provided, the computer-readable storage medium has computer program instructions stored thereon, the computer program instructions, when executed by a processor, causes the processor to implement steps of the above energy control method.

Other features and advantages of the present disclosure will become apparent from the following detailed description of the exemplary embodiments of the present disclosure with reference to the accompanying drawings.

BRIEF DESCRIPTION OF THE DRAWINGS

The accompanying drawings, which form part of the specification, describe the embodiments of the present disclosure, and together with the specification, are used to explain the principles of the disclosure.

With reference to the accompanying drawings, this disclosure can be more clearly understood from the following detailed description, in which.

DETAILED DESCRIPTION OF THE EMBODIMENTS

Various exemplary embodiments of the present disclosure will now be described in detail with reference to the accompanying drawings. It should be noted that, unless otherwise specified, the relative arrangement, numerical expressions and values of the components and steps described in these embodiments do not limit the scope of this disclosure.

Moreover, it should be understood that, for convenience of description, the dimensions of the parts shown in the accompanying drawings are not in accordance with actual proportionality.

The following description of at least one exemplary embodiment is in fact merely illustrative and does not constitute any limitation on the present disclosure and the application or usage of the present disclosure.

The technologies, methods and devices known to those of ordinary skill in the relevant fields may not be discussed in detail, but, where appropriate, the technologies, the methods and the devices shall be considered as part of the allowed specification.

In all the examples shown and discussed herein, any specific value should be interpreted as merely an example, not as a limitation. Other examples of example embodiments may therefore have different values.

It should be noted that similar reference numerals and letters denote similar terms in the following figures, so that once a particular term is defined in one of the figures, further discussion is not required in the subsequent drawings.

In order to make the objectives, technical options and advantages of the present disclosure clearer and better understood, details of this disclosure are further provided combining with specific embodiments and with reference to the accompanying drawings.

Figure 1:
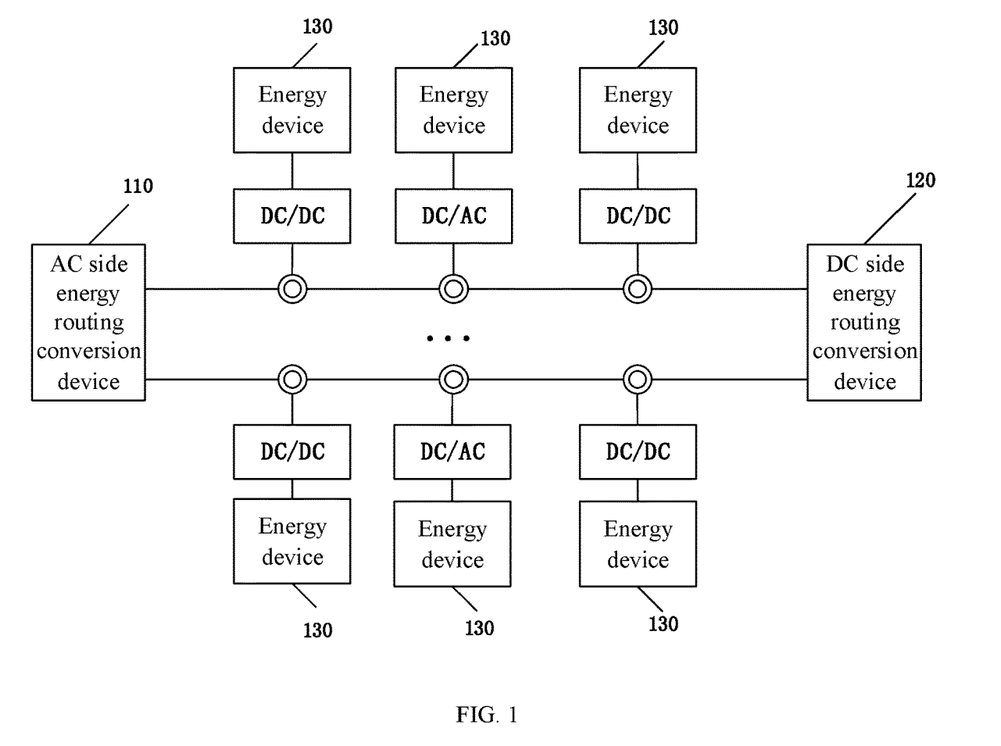
FIG. 1 is a schematic structural diagram illustrating some embodiments of an energy Internet system of the present disclosure.

FIG. 1 is a schematic structural diagram of some embodiments of an energy Internet system of the present disclosure. The energy Internet system includes an alternating-current (AC) side energy routing conversion device 110, a direct-current (DC) side energy routing conversion device 120, and a plurality of energy devices 130.

The AC side energy routing device 110 can convert AC voltage to DC voltage, and also can realize functions of energy information collection and information routing. The DC side energy routing device 120 can convert one DC voltage value into another DC voltage value, and realize the functions of the energy information collection and the information routing.

The AC side energy routing conversion device 110 includes a plurality of first route ports; the DC side energy routing conversion device 120 includes a plurality of second route ports; the number of the first route ports is the same as the number of second route ports; and each second route port is connected to a corresponding first route port by a corresponding DC busbar. In FIG. 1, only two first route ports and two second route ports are shown, that is, a two dimensional energy Internet system is shown. A person skilled in the art should understand that energy Internet systems of more dimensions can be provided according to actual conditions.

Figure 2:
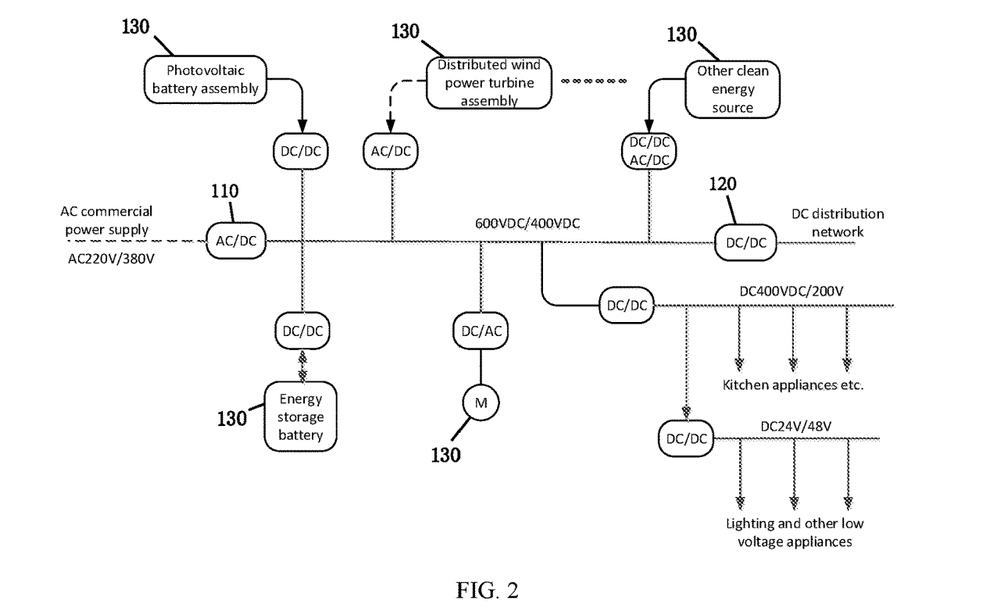
FIG. 2 is a schematic structural diagram illustrating other embodiments of an energy Internet system of the present disclosure.

The energy device 130 can be an energy storage device, a power consumption device, or a power generation device, etc. The energy device 130 can be connected to the DC busbar by a corresponding first AC/DC converter or a first DC/DC converter. For example, as shown in FIG. 2, if the energy device 130 is an energy storage device, the energy device 130 can be connected to a DC busbar by a DC/DC converter. If the energy device 130 is an AC power consumption device, it is connected to DC busbar by a DC/AC converter. If energy device 130 is a DC power consumption device such as a kitchen appliance, it is connected to the DC busbar by the DC/DC converter. If the energy device 130 is a low voltage DC power consumption device such as a lighting device, the energy device 130 can be connected to the DC busbar by the DC/DC converter again to ensure the safety of low voltage DC power consumption. If the energy device 130 is a power generation device, such as a distributed wind power turbine assembly, then the energy device 130 is connected to the DC busbar through an AC/DC converter. If the energy device 130 is a photovoltaic battery assembly, the energy device 130 is connected to the DC busbar through the DC/DC converter. Of course, the power generation device can also be of other clean energy source, and is connected to the DC busbar through a corresponding DC/DC converter or AC/DC converter. The busbar voltage value of each level can be defined as any other DC voltage level.

A masterless communication can be used for information exchange between the AC side energy routing device 110, the DC side energy routing device 120, and the plurality of energy devices 130.

In the foregoing embodiments, the AC side energy routing conversion device 110 and the DC side energy routing conversion device 120 collect energy information of each energy device 130 and adjust the energy of each energy device 130 on the basis of the energy balance constraint conditions, thereby realizing a balanced operation of the energy exchange of the energy Internet system.

Figure 3:
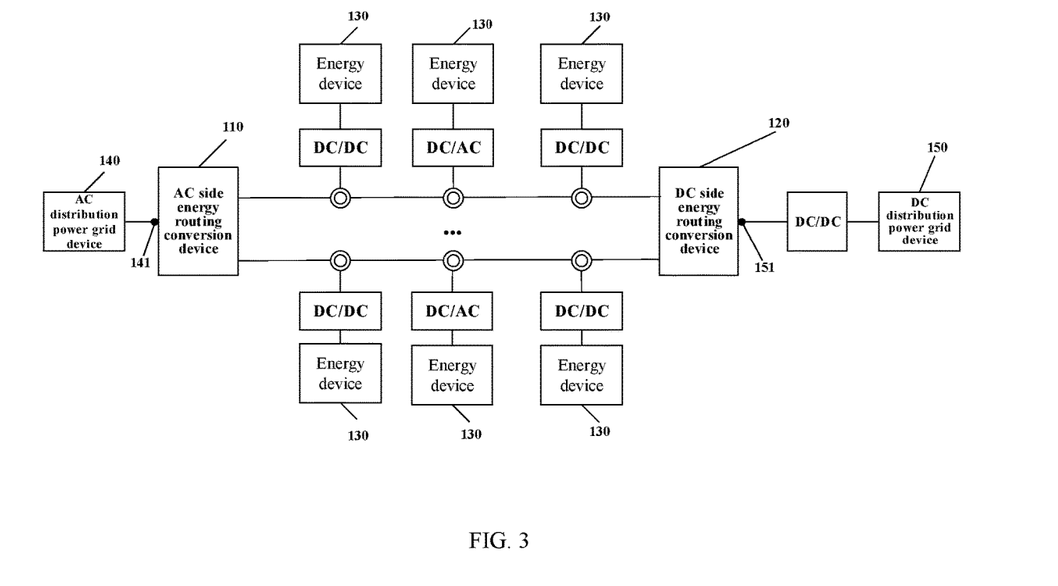
FIG. 3 is a schematic structural diagram illustrating yet other embodiments of an energy Internet system of the present disclosure.

In other embodiments of the present disclosure, as shown in FIG. 3, the AC side energy routing conversion device 110 further includes an AC access terminal 141 configured to access the AC distribution power grid device 140; the DC side energy routing conversion device 120 further includes a DC access terminal 151 configured to access the DC distribution power grid device 150 through a second DC/DC converter. That is, the energy Internet system of the present disclosure can operate in a grid connected mode or in an islanding mode.

In some embodiments, if the energy Internet system includes the AC distribution power grid device 140, the AC side energy routing conversion device 110 adjusts the energy of the energy device 130 and the energy of the AC distribution power grid device 140 on the basis of the energy balance constraint condition after collecting energy information of the energy device 130 and the AC distribution power grid device 140.

In other embodiments, if the energy Internet system includes the DC distribution power grid device 150, after collecting energy information of the energy device 130 and the DC distribution power grid device 150, the DC side energy routing conversion device 120 adjusts the energy of the energy device 130 and the energy of the DC distribution power grid device 150 on the basis of the energy balance constraint conditions.

Figure 4:
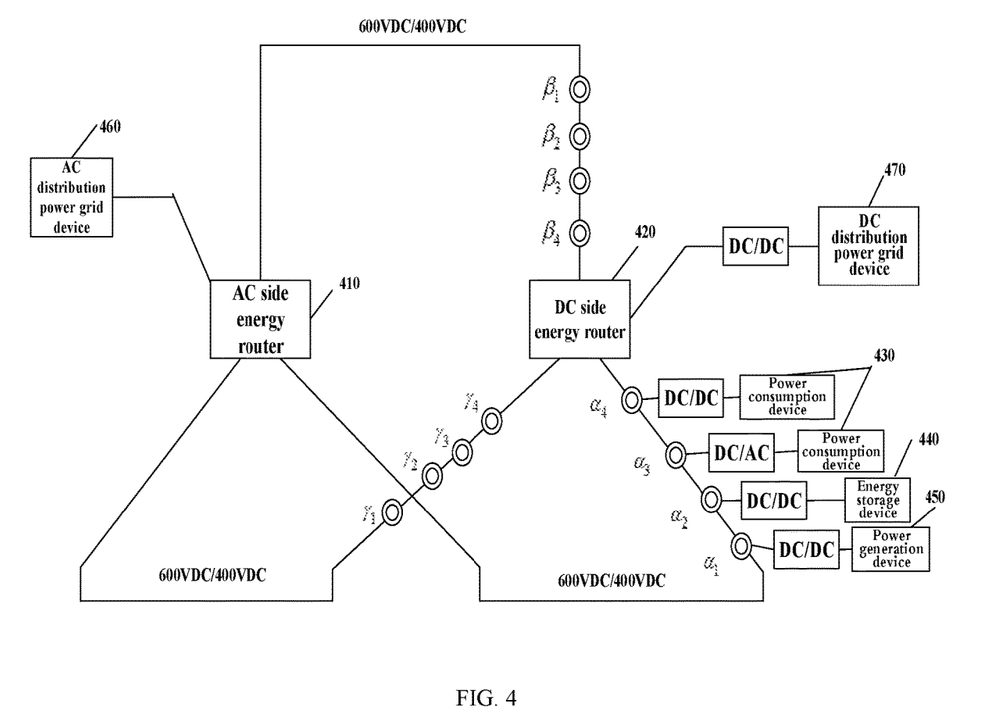
FIG. 4 is a schematic structural diagram illustrating still other embodiments of an energy Internet system of the present disclosure.

FIG. 4 is a schematic structural diagram of yet other embodiments of the energy Internet system of the present disclosure. The AC side energy routing conversion device is an AC side energy router 410; the DC side energy routing conversion device is a DC side energy router 420. From view of energy, the energy router can maintain an electrical energy supply-demand balance of the energy Internet system, thereby routing energy transmission direction autonomously, and realizing a free distribution of energy. This embodiment is illustrated by taking a three dimensional energy Internet system as an example.

Three first route ports of the AC side energy router 410 are respectively connected to three second route ports of the DC side energy router 420 by a DC busbar. If the power consumption device 430 is a DC load, the power consumption device 430 can be connected to a node $\alpha 4$ of the DC busbar by the DC/DC converter. If the power consumption device 430 is an AC load, the power consumption device 430 can be connected to a node $\alpha 3$ of the DC busbar by the DC/AC converter. The power consumption device 430 has behavior characteristics, that is, the power consumption device 430 can collect, in real time, energy parameters thereof such as voltage parameters, current parameters, power parameters, and electricity quantity parameters, as well as operation state parameters, report the parameters, and can receive the instructions issued by the system. The energy storage device 440 can be connected to a node $\alpha 2$ of the DC busbar by the DC/DC converter, and the power generation device 450 may be connected to a node $\alpha 1$ of a DC busbar by the DC/DC converter. The nodes $\beta 1$, $\beta 2$, $\beta 3$, $\beta 4$, $\gamma 1$, $\gamma 2$, $\gamma 3$ and $\gamma 4$ of the DC busbar in the figure can also be connected to a corresponding energy device, which is not shown in FIG. 4.

The AC access terminal of the AC side energy router 410 can access the AC distribution power grid device 460, and the DC side energy router 420 can access the DC distribution power grid device 470 through the DC/DC converter. The AC side energy router 410 can also be disconnected from the AC distribution power grid, and the DC side energy router 420 can be disconnected from the DC distribution power grid. That is, the multidimensional energy Internet system in this embodiment can operate in a mode of an AC and DC double-loop network system, a double-close-loop, an AC single-loop network, or a DC single-loop network.

In some embodiments, the AC side energy router 410 collects energy information of the power consumption device 430, the energy storage device 440, the power generation device 450, and the AC distribution power grid device 460, and adjusts the energy of the power consumption device 430, energy of the energy storage device 440, energy of the power generation device 450, and energy of the AC distribution power grid device 460 respectively on the basis of energy balance constraint conditions. Under the conditions that the conversion loss and other losses of the system are ignored, and that one direction of energy flow is set, an energy balance relationship should exist at the connection point of the DC busbar, and the power consumption device 430, the energy storage device 440, the power generation device 450, and the AC distribution power grid device 460 can participate in an autonomous scheduling response according to the requirement of the independent control of the AC side energy router 410.

The energy balance constraint conditions includes that the voltage parameters, the current parameters, the power parameters, and the electricity quantity parameters of the power consumption device 430, the energy storage device 440, the power generation device 450, and the AC distribution power grid device 460 are within respective threshold ranges thereof respectively, that a sum of powers of the power consumption device 430, the energy storage device 440, the power generation device 450, and the AC distribution power grid device 460 is 0, and that a sum of currents is also 0. In addition, for a three dimensional energy Internet system, both a sum of powers and a sum of currents of three DC busbars is 0.

In some embodiments, the DC side energy router 420 collects energy information of the power consumption device 430, the energy storage device 440, the power generation device 450, and the DC distribution power grid device 470, and adjusts the energy of the power consumption device 430, the energy of the energy storage device 440, the energy of the power generation device 450, and the energy of the DC distribution power grid device 470 respectively on the basis of the energy balance constraint conditions in a regulation manner similar to that of the previous embodiment.

In the embodiments above, by means of the connection relationships and the information exchange of the components in the three dimensional energy Internet system, the present invention achieves the autonomous control, stable operation and economic scheduling of the power generation device, the energy storage device, the power consumption device, and the distribution power grid device under the energy Internet system architecture.

In addition, if one dimensional energy Internet system is added to the energy Internet system of original dimensions, as the router can schedule the energy in time, each device itself can respond to the demand of power consumption, which enables the system to reach the energy balance swiftly, thereby ensuring the reliable and safe operation of the system, and reducing the circulation problem of the system.

Figure 5:
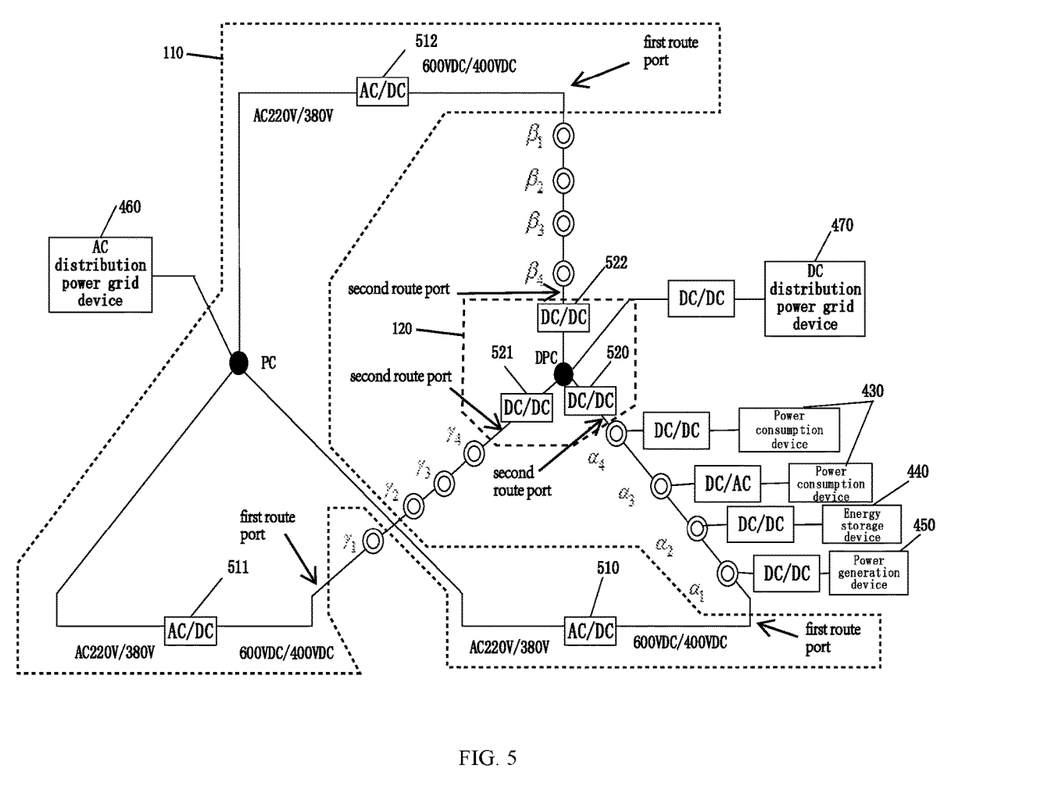
FIG. 5 is a schematic structural diagram illustrating still other embodiments of an energy Internet system of the present disclosure.

FIG. 5 is a schematic structural diagram illustrating still other embodiments of the energy Internet system of the present disclosure. The embodiment is described by taking a three dimensional energy Internet system as an example. The AC side energy routing conversion device includes three third AC/DC converters 510, 511, and 512, and the DC side energy routing conversion device includes three third DC/DC converters 520, 521 and 522. A first end of the third AC/DC converter 510, a first end of the third AC/DC converter 511, and a first end of the third AC/DC converter 512 are connected to a PC node; a first end of the third DC/DC converter 520, a first end of the third second DC/DC converter 521, and a first end of the third DC/DC converter 522 are connected to a DPC node. A second end of each third AC/DC converter serves as a first route port, and a second end of each third DC/DC converter serves as a second route port. That is, the second end of the third AC/DC converter 510 is connected to the second end of the third DC/DC converter 520 by a DC busbar; the second end of the third AC/DC converter 511 is connected to the second end of the third DC/DC converter 521 by a DC busbar; and the second end of the third AC/DC converter 512 is connected to the second end of the third DC/DC converter 522 by a DC busbar. The AC distribution power grid device 460 is connected to the PC node, and the DC distribution device 470 is connected to the DPC node. The connection relationships between the power consumption device 430, the energy storage device 440, and the power generation device 450 are identical with the connection relationships shown in FIG. 4.

In this embodiment, the third AC/DC converters 510, 511, 512 and the third DC/DC converters 520, 521, 522 can monitor the operation status and energy of the components by means of their own sensors and metering elements, or by means of external additional power meters, thereby realizing an energy balance between all dimensions and between all energy devices and all distribution power grid devices.

In some embodiments, there can be a masterless communication between all converters. Because the multidimensional system adopts the networking mode of AC and DC interconnection and the masterless scheduling mode, the single dimensional systems in the system each are in an equal and parallel architecture, which facilitates the "plug and play" of the distributed system, as well as achieves a free distribution, a cooperative complementarity, and an integrated equilibrium operation of energy.

Figure 6:
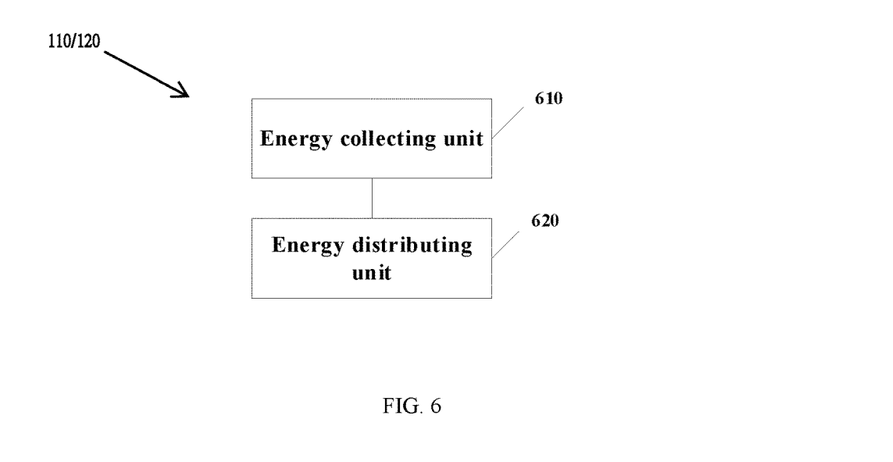
FIG. 6 is a schematic structural diagram of some embodiments of an energy routing conversion device of the present disclosure.

FIG. 6 is a schematic structural diagram illustrating some embodiments of the energy routing conversion device of the present disclosure. The energy routing conversion device can be the AC side energy routing conversion device or the DC side energy routing conversion device. The energy routing conversion device includes an energy collecting unit 610 and an energy distributing unit 620. The energy collecting unit 610 is electrically connected to the energy distributing unit 620. The energy collecting unit 610 can be implemented by a power meter or a sensor. The energy distributing unit 620 can be implemented by a controller. The controller can be a specific hardware device consists of a PLC, an integrated circuit, a related component, and the like.

The energy collecting unit 610 is configured to collect energy information of a plurality of energy devices. The energy information includes the voltage parameters, the current parameters, the power parameters, and the electricity quantity parameters. The energy distribution unit 620 is configured to adjust the energy of each energy device on the basis of the energy balance constraint conditions, thus realizing the energy balance between the devices.

In some embodiments, if the energy Internet system includes the distribution power grid device, the energy collecting unit 610 is configured to further collect energy information of the distribution power grid device, and the energy distribution unit 620 is configured to adjust the energy of the distribution power grid device and the energy of the energy device on the basis of the energy balance constraint conditions.

In some embodiments, for a multidimensional energy Internet system, the energy collecting unit 610 is configured to further collect energy information of each DC busbar, and the energy distribution unit 620 is configured to further adjust energy of each DC busbar on the basis of the energy balance constraint conditions, thereby realizing an energy balance between all dimensions of the energy Internet system.

In some embodiments, the energy balance constraint conditions include that the voltage parameters u, the current parameters i, the power parameters p, and electricity quantity parameters q of the power generation device, the energy storage device, the power consumption device, and the distribution power grid device are within respective threshold ranges. In other words, the power generation device, the energy storage device, the power consumption device, and the distribution power grid device in the energy Internet system operate within their own redundancy ranges respectively, as shown in the following formulas:

$$(u,i,p,q)_{gene\_min} < (u,i,p,q)_{gene} < (u,i,p,q)_{gene\_max};$$

$$(u,i,p,q)_{bat\_min} < (u,i,p,q)_{bat} < (u,i,p,q)_{bat\_max};$$

$$(u,i,p,q)_{grid\_min} < (u,i,p,q)_{grid} < (u,i,p,q)_{grid\_max};$$

$$(u,i,p,q)_{load\_min} < (u,i,p,q)_{load} < (u,i,p,q)_{load\_max};$$

Where $(u, i, p, q)_{gene}$, $(u, i, p, q)_{bat}$, $(u, i, p, q)_{grid}$, and $(u, i, p, q)_{load}$ are values of the voltage parameters u, the current parameters i, the power parameters p, and the electricity quantity parameters q of the power generation device, the energy storage device, the distribution power grid device, and the power consumption device which are in stable operation states, respectively. The $(u, i, p, q)_{gene\_min}$, $(u, i, p, q)_{bat\_min}$, $(u, i, p, q)_{grid\_min}$, and $(u, i, p, q)_{load\_min}$ are the minimum values of the voltage parameters u, the current parameters i, the power parameters p, and the electricity quantity parameters q of the power generation device, the energy storage device, the distribution power grid device, and the power consumption device, respectively. And the $(u, i, p, q)_{gene\_max}$, $(u, i, p, q)_{bat\_max}$, $(u, i, p, q)_{grid\_max}$, and $(u, i, p, q)_{load\_max}$ are the maximum values of the voltage parameters u, the current parameters i, the power parameters p, and the electricity quantity parameters q of the power generation device, the energy storage device, the distribution power grid device, and the power consumption device, respectively.

The power parameter of the power generation device is $p_{gene} = f(f_1(u, i, s), f_2(u, i, s) \ldots )$, that is, power parameter of the power generation device is related to the voltage parameter, the current parameter, and the characteristic parameter. Different types of new energy power generation devices have different characteristic parameters. For example, a photovoltaic characteristic parameter includes an illumination parameter, and the wind power characteristic parameter includes wind speed and other parameters.

The power parameter of the energy storage device is $p_{bat} = f(u, i, T, soc, soh)$, that is, the power parameter of the energy storage device is related to the voltage parameter, the current parameter, the temperature parameter, and capacity parameter. As for the energy storage device, such as a battery, soc denotes the charge state of the battery with a value ranged from 0 to 1. soc=0 indicates that the battery is fully discharged, and soc=1 indicates that the battery is fully charged. soh denotes the health state of the battery, i.e., the percentage of a maximum discharge capacity to a rated capacity, which is 100% for a newly shipped battery and 0% for a scrapped battery.

The power parameter of the power consumption device is $p_{load} = f(f_1(u, i), f_2(u, i) \ldots )$, that is, the power parameter of the power consumption device is related to the voltage parameter and the current parameter.

The power parameter of the distribution power grid device is $p_{grid} = f(u, i, \cos \varphi)$, that is, the power parameter of the distribution power grid device is related to the voltage parameter, the current parameter, and a power factor parameter.

For a single dimensional energy Internet system, the energy balance of the system should meet $u_{dc} = u_{dc\_ref}$ where $u_{dc}$ denotes a voltage of the DC busbar, and $u_{dc\_ref}$ denotes a reference voltage of the DC busbar; a sum of the power parameters p of the power generation device, the energy storage device, the distribution power grid device, and the power consumption device is 0, i.e. $p_{grid} + p_{gene} + p_{bat} + p_{load} = 0$. Moreover, a sum of the current parameters i of the power generation device, the energy storage device, the distribution power grid device, and the power consumption device is 0, i.e. $i_{grid\_dc} + i_{gene\_dc} + i_{bat\_dc} + i_{load\_dc} = 0$. In addition, the energy balance of the system meets $u_{dc} = u_{gene} = u_{bat}$, where $u_{gene}$ denotes the voltage of the power generation device, and $u_{bat}$ denotes the voltage of the energy storage device.

When the energy of the system changes, the power generation device, the energy storage device, the distribution power grid device, and the power consumption device can all participate in the energy regulation. After the energy changes, the system remains stable, that is, the energy keeps in a balance, and the voltage of the busbar keeps constant.

When the multidimensional energy Internet system is operating, if the light increases suddenly, then the power generation of the new energy will increase suddenly, and devices including the energy storage device, the distribution power grid device, and the power consumption device are all beyond their own allowable redundancy ranges. If these devices cannot consume the excess energies, then they must operate at a limited power. When operating in an islanding mode, the allowed redundancy capacity of the distribution power grid is 0. As shown in FIGS. 4 and 5, when the multidimensional system is operating, if the system α experiences the situations as described above, the excess energy can be freely distributed to the system β or the system γ to be consumed, and the plurality of systems cooperate with each other. Similarly, if the energy of a single dimensional system is insufficient, the single dimensional system can freely obtain the remaining energy of other systems connected to the busbar.

The sum of the powers of all DC busbars is 0, that is, the sum of the powers of all dimensions of energy Internet system is 0, and $p_{dc\_dg1} + p_{dc\_dg2} + \ldots + p_{dc\_dgn} = 0$ is satisfied, where $p_{dc\_dgn} = f_n(f_n(f_1(v, i, t, s), f_2(v, i, t, d) \ldots ), f_n(v, i, T, soc), f_n(f_1(v, i), f_2(v, i) \ldots ))$, and $p_{dc\_dgn}$ is a real-time function constructed according to the power generation system, the energy storage system, the power consumption system of each dimension of the energy Internet system itself, and is a direct interaction and scheduling object of the multidimensional system. Also, a sum of the currents of all DC busbars is 0, that is, the sum of the currents of all dimensions of energy Internet system is 0, and $i_{dc\_dg1} + i_{dc\_dg2} + \ldots + i_{dc\_dgn} = 0$ is satisfied.

Since the load of the power generation device, the load of the energy storage device, the load of the distribution power grid device and the load of the power consumption device involved in the system shall be within the their own allowable redundancy capacities, the voltage parameters u, the current parameters i, the power parameters p, and the electricity quantity parameters q of the power generation device, the energy storage device, the power consumption device, and the distribution power grid device of each dimension shall meet the following conditions:

$$(u,i,p,q)_{gene\_n\_min} < (u,i,p,q)_{gene\_n} < (u,i,p,q)_{gene\_n\_max};$$

$$(u,i,p,q)_{bat\_n\_min} < (u,i,p,q)_{bat\_n} < (u,i,p,q)_{bat\_n\_max};$$

$$(u,i,p,q)_{grid\_n\_min} < (u,i,p,q)_{grid\_n} < (u,i,p,q)_{grid\_n\_max};$$

$$(u,i,p,q)_{load\_n\_min} < (u,i,p,q)_{load\_n} < (u,i,p,q)_{load\_n\_max};$$

Where the $(u, i, p, q)_{gene\_n}$, $(u, i, p, q)_{bat\_n}$, $(u, i, p, q)_{grid\_n}$, and $(u, i, p, q)_{load\_n}$ are values of the voltage parameters u, current parameters i, power parameters p, and electricity quantity parameters q of the power generation device, the energy storage device, the distribution power grid device, and the power consumption device operate stably in a same dimension, respectively. The $(u, i, p, q)_{gene\_n\_min}$, $(u, i, p, q)_{bat\_n\_min}$, $(u, i, p, q)_{grid\_n\_min}$, and $(u, i, p, q)_{load\_n\_min}$ are minimum values of the voltage parameters u, the current parameters i, the power parameters p, and the electricity quantity values q of the power generation device, the energy storage device, the distribution power grid device, and the power consumption device in a same dimension, respectively. And the $(u, i, p, q)_{gene\_n\_max}$, $(u, i, p, q)_{bat\_n\_max}$, $(u, i, p, q)_{grid\_n\_max}$, and $(u, i, p, q)_{load\_n\_max}$ are maximum values of the voltage parameters u, the current parameters i, the power parameters p, and the electricity quantity values q of the power generation device, the energy storage device, the distribution power grid device, and the power consumption device in a same dimension.

Moreover, the energy balance of the system should satisfy $u_{dc} = u_{dc\_ref}$, where $u_{dc}$ is a DC busbar voltage, and $u_{dc\_ref}$ is a DC busbar reference voltage; a sum of power parameters p of the power generation device, the energy storage device, the distribution power grid device, and the power consumption device in a same dimension is 0, i.e. $p_{grid\_n} + p_{gene\_n} + p_{bat\_n} + p_{load\_n} = 0$. Moreover, a sum of current parameters i of the power generation device, the energy storage device, the distribution power grid device, and the power consumption device in a same dimension is 0, i.e. $p_{grid\_n\_dc} + p_{gene\_n\_dc} + p_{bat\_n\_dc} + p_{load\_n\_dc} = 0$. In addition, the system energy balance satisfies $u_{dc} = u_{gene\_n} = u_{bat\_n}$, where $u_{gene\_n}$ is the voltage of the power generation device of a dimension, and $u_{bat}$ is the voltage of the energy storage device of a dimension.

When the multidimensional system is operating normally, the voltage of the busbar is constant, and switching on or switching off a single dimensional system does not affect the normal operation of the multidimensional system. In the multidimensional system, the single dimensional systems each are parallel and independent individuals with autonomous control ability and communicate with one another through a masterless communication, and the energy data can be involved in a real-time control and scheduling.

In a specific embodiment, as for a single dimensional energy Internet system, the rated power of the power generation device, the rated power of the energy storage device, the rated power of the distribution power grid device, and the rated power of the power consumption device in the system can be configured to be an extreme architecture of 1:1:1:3. The details are as follows:

The power generation device is photovoltaic, and the rated power thereof is 5 kW; the rated charging and discharging power of the energy storage device is 5 kW, and the capacity is 20 kwh (discharging for 4 hours); the rated operating power of the power grid side is 5 kW; and the rated consumption power of the power consumption device is 15 kW.

The power generation device, the energy storage device, and the distribution power grid device all provide full power outputs when the energy Internet system is operating at full load. When the photovoltaic power is reduced by 3 kW, in order to satisfy the constraint condition, the power consumption device can autonomously regulate a consumption power thereof to be reduced by 3 kW so as to meet the energy balance relationship. When the power of the power consumption device is reduced by 3 kW breaking the original energy balance, the photovoltaic power generation device, the energy storage device, and the distribution power grid device are regulated autonomously according to a configuration relationship of 1:1:1 (the powers of the power generation device, the energy storage device, and the distribution power grid device are reduced by 1 kW respectively), or regulated autonomously according to a specific adjustment ratio. The extreme regulation mode is a single energy regulation, for example, when the power of the power consumption device is reduced by 3 kW, only the power of the distribution power grid device is decreased by 3 kW to achieve a regulation; if the power of the power consumption device is reduced till the output of the power grid does not meet the constraint conditions, then the energy of the electric distribution device is not regulated. In this case, configured by the system, the power of the photovoltaic power generation device is 5 kW; the power of the energy storage device is 5 kW; and the power of the electric load is 10 kW, which means that the power generation device, the energy storage device, and the power consumption device are structured in accordance with an extreme limit of 1:1:2 of an islanding mode. Similarly, in the case that the photovoltaic energy or load energy changes, the regulation is performed in accordance with a set proportion or a specific regulation manner on the basis of the described energy balance relationship.

When the energy of a component of the power generation device, the energy storage device, the power consumption device, and the distribution power grid device in the system changes, the rest components will be adjusted according to a preset regulation mode. If the energy of a plurality of components in the system changes at the same time, the regulations can be superposed according to a rule. When the system is operating in an islanding mode, $(u, i, p, q)_{grid} = 0$.

As for the multidimensional energy Internet system, as shown by the three dimensional system in FIG. 4 and FIG. 5, the system α, the system β, and the system γ all operate normally and independently. As found from the real-time monitoring for the system, the energy of the system α is suddenly increased by 10 kW. After an internal adjustment in the system α, the devices each reach their own allowable redundancy limits, and the remaining energy of 4 kW has not been consumed yet. At this moment, the energy is scheduled to the system β and system γ for consumption, and the system β and the system γ distribute energy according to a preset scheduling method and make a regulation. For another example, the load of the system β increases suddenly during the operating of the system. If the power demand cannot be satisfied even after each device reaches the allowable redundancy limit by means of an internal adjustment in the system β, then the system α or/and the system γ are scheduled to supplement energy.

In addition, the energy Internet can also be configured with some specific operation modes or customized schedules by the management system. For example, when the system β operates at the electricity price peak, when they have surplus energy, the photovoltaic and other generation devices can be required not to charge the energy storage device, but to be connected to a grid so as to make profit; and the energy storage device is charged by the power grid device at the electricity price valley.

Figure 7:
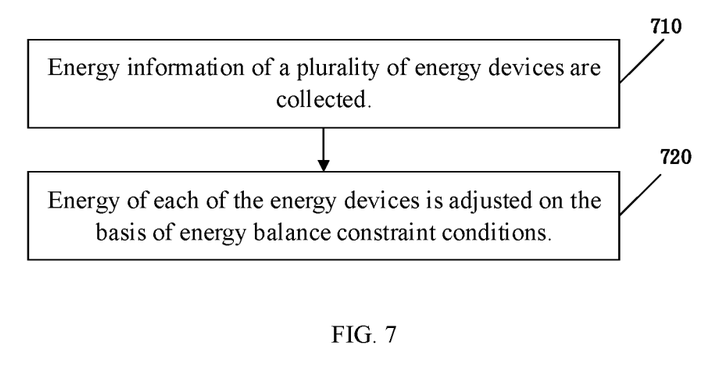
FIG. 7 is a schematic flowchart illustrating some embodiments of an energy control method of the present disclosure.

FIG. 7 is a schematic flowchart of some embodiments of the energy control method of the present disclosure.

At step 710, energy information of a plurality of energy devices are collected. Where the energy information includes voltage parameters, current parameters, power parameters, and electricity quantity parameters.

At step 720, energy of each of the energy devices is adjusted on the basis of energy balance constraint conditions. The energy devices include an energy storage device, a power consumption device, or a power generation device etc. The energy balance constraint conditions are described in detail in the above embodiments, and not described repeatedly hereafter.

In this embodiment, the distribution power grid is not provided, that is, the energy Internet system operates in an islanding mode. A balanced and stable operation of the energy Internet system can be achieved by means of the energy scheduling of the energy device.

Figure 8:
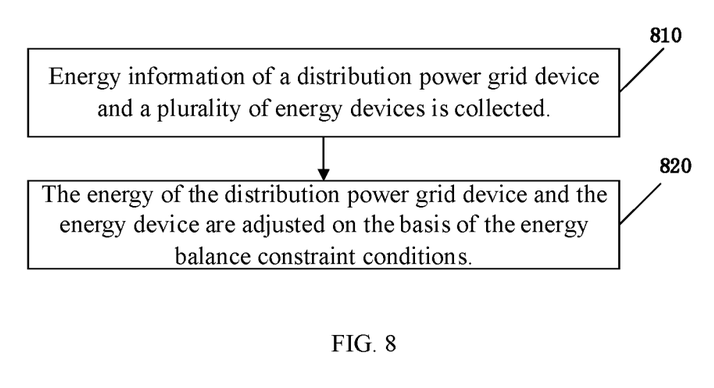
FIG. 8 is a schematic flowchart illustrating other embodiments of an energy control method of the present disclosure.

FIG. 8 is a schematic flowchart of other embodiments of the energy control method of the present disclosure.

At step 810, energy information of a distribution power grid device and a plurality of energy devices is collected.

At step 820, the energy of the distribution power grid device and the energy of the energy devices are adjusted on the basis of the energy balance constraint conditions.

In this embodiment, the power distribution power grid is added, that is, the energy Internet system operates in a grid connected mode. A balanced and stable operation of the energy Internet system can be realized by means of scheduling the energy of the power distribution power grid device and the energy device.

Figure 9:
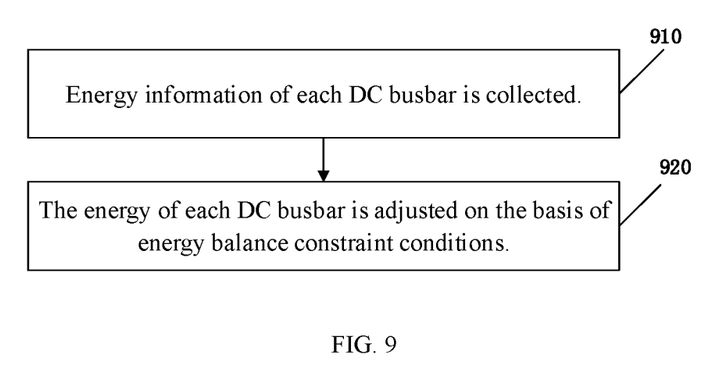
FIG. 9 is a schematic flowchart illustrating yet other embodiments of an energy control method of the present disclosure.

FIG. 9 is a schematic flowchart of yet other embodiments of the energy control method of the present disclosure. If the energy Internet system is a multidimensional system, the method includes:

At step 910, energy information of each DC busbar is collected. That is, voltage parameters, current parameters, power parameters, and electricity quantity parameters of each dimension of the system are detected.

At step 920, the energy of each DC busbar is adjusted on the basis of energy balance constraint conditions. The energy flow direction of each dimension of the system is determined, and the energy of each dimension of the system is scheduled synthetically on the basis of the energy balance constraint conditions of each dimension.

In this embodiment, the voltage parameters, the current parameters, the power parameters, and the electricity quantity parameters of each dimension should meet the energy balance constraint conditions, thus realizing the energy balance of the system and enabling the system to operate stably.

Figure 10:
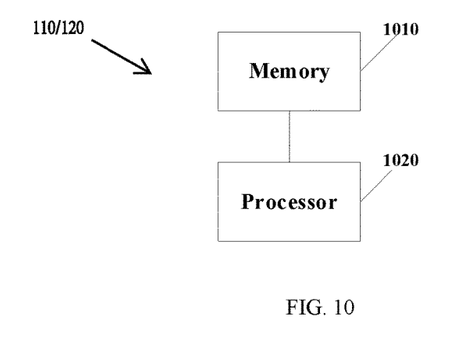
FIG. 10 is a schematic structural diagram illustrating an energy routing conversion device of some embodiments of the present disclosure.

FIG. 10 is a schematic structural diagram illustrating some embodiments of the energy routing conversion device of the disclosure. The device includes a memory 1010 and a processor 1020. The memory 1010 can be a disk, a flash or any other non-transitory storage medium. The memory is configured to store instructions in the corresponding embodiments of FIGS. 7-9. The processor 1020 is coupled to the memory 1010 and can be implemented as one or more integrated circuits, such as microprocessors or microcontrollers. The processor 1020 is configured to execute instructions stored in the memory.

Figure 11:
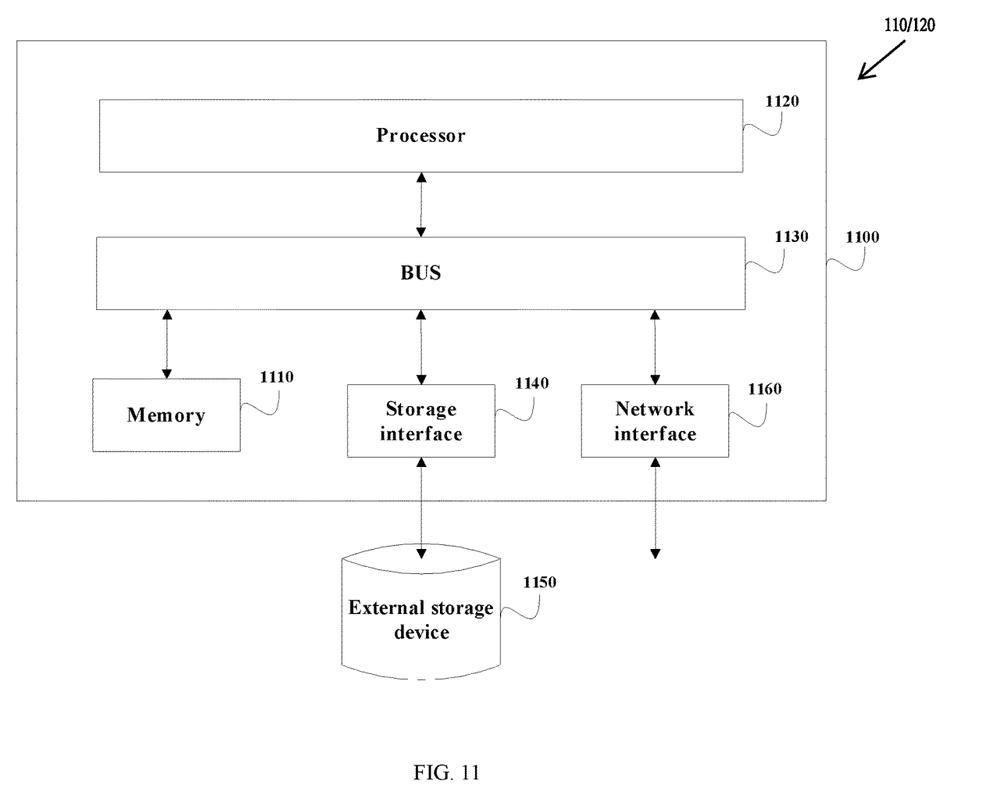
FIG. 11 is a schematic structural diagram illustrating an energy routing conversion device of some embodiments of the present disclosure.

In some embodiments, as shown in FIG. 11, the device 1100 includes a memory 1110 and a processor 1120. The processor 1120 is coupled to the memory 1110 through the BUS 1130. The device 1100 can also be connected to an external storage device 1150 via a storage interface 1140 to call external data, or can be connected to a network or another computer system (not shown) via a network interface 1160. Details are not described herein.

In this embodiment, by storing data instructions in the memory and then processing the instructions by the processor, the energy exchange and the balance operation of the energy Internet system can be achieved.

In other embodiments, a computer-readable storage medium stores computer program instructions, when are executed by a processor, implement the steps of the methods of the corresponding embodiments of FIGS. 7-9. Those skilled in the art should understand that the embodiments of the present disclosure can be provided as methods, devices, or computer program products. Thus, the present disclosure can use the form of full hardware embodiments, full software embodiments, or embodiments combining software and hardware. Furthermore, the present disclosure can use the form of computer program products to be implemented on one or more computer-executable non-transitory storage media (including but not limited to disk storage, a CD-ROM, an optical storage, etc.) including computer-executable program codes.

This disclosure is described with reference to flowcharts and/or block diagrams of the methods, the equipment (systems) and the computer program products according to the embodiments of this disclosure. It should be understood that each process and/or block in a flowchart and/or block diagrams as well as the combination of processes and/or blocks in the flowchart and/or the block diagrams can be implemented by computer program instructions. Such computer program instructions can be provided to a processor of a general computer, a special computer, an embedded processor, or any other programmable data processing device to produce a machine, so that the instructions executed by the processor of the computer or any other programmable data processing device produce a device to perform a function specified in one or more processes of the flow chart and/or one or more blocks of the block diagrams.

These computer program instructions can also be stored in a computer-readable memory capable of directing a computer or any other programmable data processing device to work in a particular manner, so that the instructions stored in such computer-readable memory produce a manufactured article including an instructional device that implements a function specified in one or more processes in the flowchart and/or specified in one or more blocks in the block diagrams.

These computer program instructions can also be loaded onto a computer or any other programmable data processing device, so that a series of operational steps are performed on the computer or on any other programmable device to produce the computer-implemented processing, so that the instructions performed on the computer or on any other programmable device provide steps for achieving a function specified in one or more processes of the flowchart and/or specified in one or more blocks of the block diagrams.

Heretofore, this disclosure has been described in detail. To avoid obscuring the concepts of the present disclosure, some details known in the art are not described. On the basis of the above description, the skilled in the art can fully understand how to implement the technical solutions disclosed herein.

Although some specific implementations of this disclosure have been described in detail by means of examples, a person skilled in the art should understand that the above examples are only for illustrative purposes but not intended to limit the scope of this disclosure. A person skilled in the art should understand that the above embodiments may be modified without departing from the scope and the spirit of this disclosure. The scope of this disclosure is limited by the appended claims.

What is claimed is:

1. An energy-Internet system, comprising:
an alternating-current (AC) side energy routing conversion device comprising a plurality of first route ports and a plurality of third AC/DC converters, wherein first ends of the plurality of third AC/DC converters are connected to each other, and wherein a second end of each of the third AC/DC converters is used as a first route port of the plurality of first route ports;

a direct-current (DC) side energy routing conversion device comprising a plurality of second route ports and a plurality of third DC/DC converters, wherein first ends of the plurality of third DC/DC converters are connected to each other, wherein a second end of each of the third DC/DC converters is used as a second route port of the plurality of second route ports, and wherein each of the second route ports is connected to a corresponding first route port by a corresponding DC busbar; and a plurality of energy devices, each connected to the DC busbar through a corresponding first AC/DC converter or a first DC/DC converter;

wherein the AC side energy routing conversion device and the DC side energy routing conversion device are configured to collect energy information of the energy devices, and are configured to adjust energy of each of the energy devices on a basis of energy balance constraint conditions.

2. The energy-Internet system according to claim 1, wherein the AC side energy routing conversion device further comprises an AC access terminal configured to access an AC distribution power grid device; and the DC side energy routing conversion device further comprises a DC access terminal configured to access a DC distribution power grid device through a second DC/DC converter.

3. The energy-Internet system according to claim 1, wherein the AC side energy routing conversion device is an AC side energy router; and the DC side energy routing conversion device is a DC side energy router.

4. The energy-Internet system according to claim 1, wherein the energy devices comprise at least one of an energy storage device, a power consumption device, and a power generation device.

5. The energy-Internet system according to claim 1, wherein the energy information includes voltage parameters, current parameters, power parameters, and electricity quantity parameters.

6. An energy control method, comprising:

collecting energy information of a plurality of energy devices according to an alternating-current (AC) side energy routing conversion device or a direct-current (DC) side energy routing conversion device, wherein:

the alternating-current (AC) side energy routing conversion device comprises a plurality of first route ports, the direct-current (DC) side energy routing conversion device comprises a plurality of second route ports, each of the second route ports is connected to a corresponding first route port by a corresponding DC busbar, and a plurality of energy devices each are connected to the DC busbar through a corresponding first AC/DC converter or a first DC/DC converter; the AC side energy routing conversion device comprises a plurality of third AC/DC converters; first ends of the plurality of third AC/DC converters are connected to each other, and a second end of each of the plurality of third AC/DC converters is used as a first route port; the DC side energy routing conversion device comprises a plurality of third DC/DC converters; first ends of the plurality of third DC/DC converters are connected to each other, and a second end of each of the third DC/DC converters is used as a second route port; and adjusting energy of each of the plurality of energy devices on a basis of energy balance constraint conditions.

7. The energy control method according to claim 6, further comprising:

collecting energy information of a distribution power grid device; and adjusting energy of the distribution power grid device and energy of the plurality of energy devices on the basis of the energy balance constraint conditions.

8. The energy control method according to claim 6, further comprising:

collecting energy information of each DC busbar; and adjusting an energy of each DC busbar on the basis of the energy balance constraint conditions.

* * * * *